J. A. SAUER.
MUD GUARD ATTACHMENT.
APPLICATION FILED MAY 28, 1909.
952,144.
Patented Mar. 15, 1910.
2 SHEETS—SHEET 2.
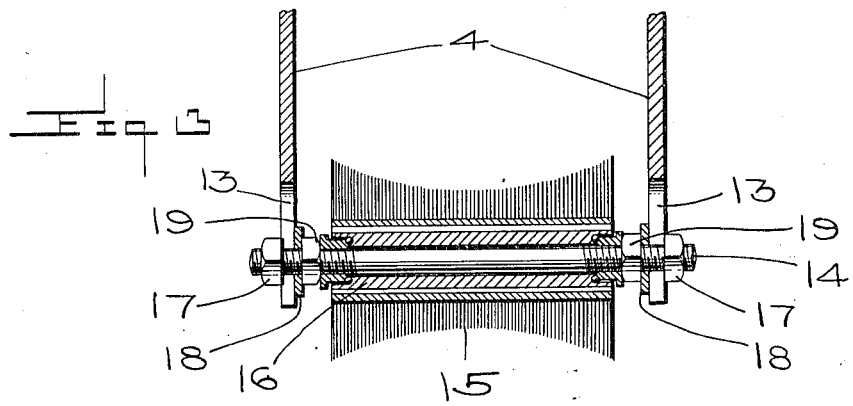
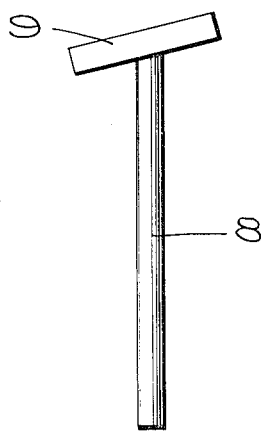
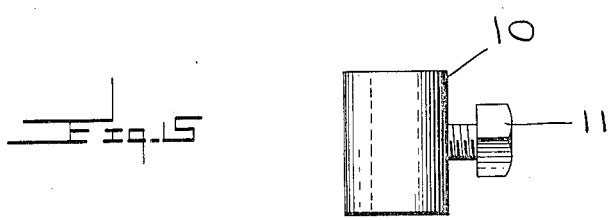
Witnesses
Ed R Lusby
E L Chandler
Inventor
Joseph A. Sauer
By Woodward & Chandlee
Attorneys

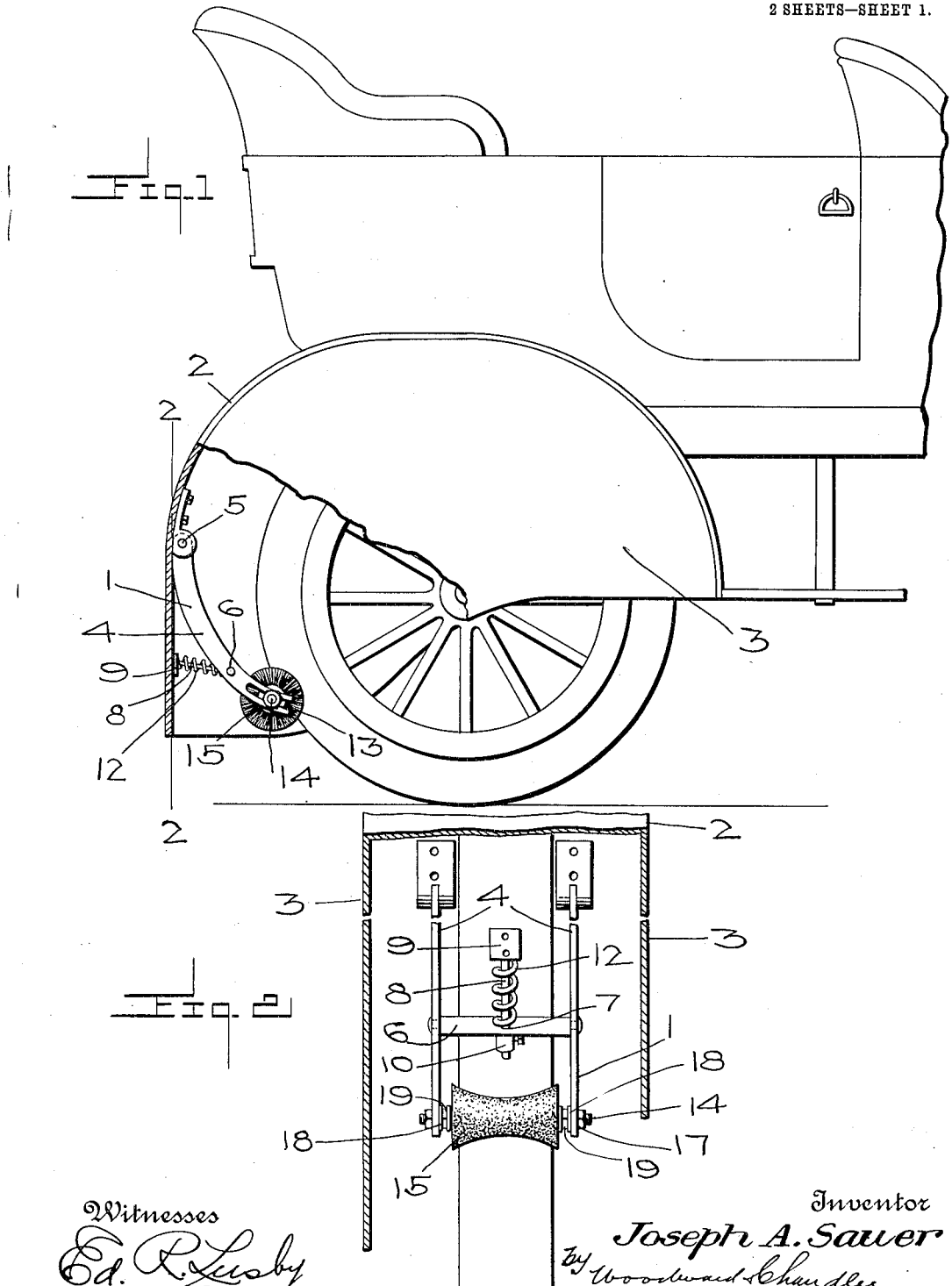

UNITED STATES PATENT OFFICE.

JOSEPH A. SAUER, OF HAMILTON, OHIO.

MUD-GUARD ATTACHMENT.

952,144.

Specification of Letters Patent. Patented Mar. 15, 1910.

Application filed May 28, 1909. Serial No. 498,804.

*To all whom it may concern:*

Be it known that I, JOSEPH A. SAUER, a citizen of the United States, residing at Hamilton, in the county of Butler and State of Ohio, have invented certain new and useful Improvements in Mud-Guard Attachments, of which the following is a specification.

This invention relates to new and useful improvements in devices which are adapted to be attached to the mud guard of a wheeled vehicle, and arranged to contact with the periphery of the wheels thereof to cleanly remove the accumulated mud therefrom.

Another object is to provide a device of this character which may be quickly attached to the mud guard of vehicles now in use, and which will automatically adjust itself to wheels of various diameters.

A further object is to provide a cleaning or scraping brush revolubly mounted between the ends of parallel curved bars in such a manner that the same may be readily adjusted therein.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 is a side elevation of an automobile or other wheeled vehicle showing my improved cleaning attachment secured to the mud guard thereof, the front of the casing being removed. Fig. 2 is an enlarged vertical section taken on the line 2—2 of Fig. 1. Fig. 3 is an enlarged detail section through the lower end of the brush supporting arm, illustrating the manner of adjusting the brush therein. Fig. 4 is a detail view of the connecting rod, and Fig. 5 is a similar view of the collar or sleeve which is adapted to be pivoted between the ears 5 secured upon the end of the connecting rod.

Referring to the drawings, 1 indicates my improved attachment which is adapted to be secured to the under side of the mud guard 2, as employed upon vehicles now in use. Side plates 3 are secured to the edges of the mud guard 2 and entirely inclose and conceal my attachment from view, thus preserving the attractive appearance of the vehicle. The attachment 1 comprises the parallel curved bars 4 which are secured to the guard 2. A brace bar 6 connects the bars 4 at an intermediate point and serves to strengthen the same. The bar 6 is provided with an opening 7 at the center thereof to receive the lower end of the rod 8, on the upper end of which is formed the plate 9 which is secured to the guard 2. Upon the lower extremity of the rod 8 and below the bar 6, a retaining collar or sleeve 10 is secured by means of the set screw 11. A spiral spring 12 is disposed upon the rod 6 between the plate 9 and the bar 6, and is adapted to absorb the shock or vibration which will be imparted to the attachment when the vehicle is being driven over rough or uneven ground.

The lower extremities of the curved bars 4 are provided with the open-ended slots 13, in which is adapted to be inserted the end of the transverse shaft 14. Upon this shaft is revolubly mounted a brush 15, between which, and the periphery of the shaft 14, a suitable bushing 16 is disposed. This brush is preferably composed of wire bristles of a slightly flexible nature which are adapted to contact with the periphery of the vehicle wheel and remove the accumulated dirt therefrom. The periphery of the brush is concaved to insure its engagement with the wheel tire at all times. The shaft 14 is secured in the ends of the bars 4 by means of the nuts 17 disposed upon the extremities of said shaft and the washers 18 and the lock nuts 19 which engage upon the opposite sides of the bars 4. It will thus be seen that the frictional engagement of the nuts 19 and 17 with the sides of the bars 4, will prevent the rotation of the shaft while at the same time the brush itself will securely hold the shaft 14 in the position to which it has been adjusted and is perfectly free to rotate thereon.

It will be obvious that upon rotation of the vehicle wheel, the dirt will be cleanly removed from the periphery thereof by means of the brush 15 which is at all times held firmly in contact with the wheel. The spring 12 is of such tensional strength that the brush will be immediately returned to its position upon the periphery of the wheel, when the same is jolted therefrom by the vibration of the vehicle. The strength of the spring 12 may be regulated by adjusting the sleeve 10 secured to the lower end thereof. Thus the frictional contact of the brush 15 may be increased or decreased at the option of the user. It will be understood of course that the rotation of the brush is such that a new wearing point will be constantly presented to the periphery of the wheel and at the same time the frictional engagement thereof will be sufficient to cleanly remove the dirt therefrom.

From the foregoing it will be seen that I have provided an attachment which may be quickly secured upon mud guards as at present constructed, and which will very efficiently perform the functions for which it is designed. It may also be very cheaply manufactured and by its adjustability is applicable to a large variety of vehicles. The parts may also be readily replaced when the same become worn or broken, thus greatly increasing the general durability of the attachment.

It will be noted that in either end of the bushing 16, suitable ball bearings are disposed thereby reducing the friction created by the rotation of the brush, to a minimum and greatly enhancing the serviceable qualities of the attachment. The tension of the spring 12 is so regulated that the pressure of the concave periphery of the brush 15 on the periphery of the vehicle tire is just sufficient to remove the dirt without injury to the tire. There will therefore be but little wear upon the tire, and as the brush is located below the center of the wheel, the mud and dirt will be cleanly removed without the necessity of great pressure of the brush upon the tire.

What is claimed is:

1. An attachment of the character described, comprising curved parallel bars pivoted to the under side of a mud guard at one of their ends, the free ends of said bars having longitudinal slots formed therein, a transverse shaft adjustably mounted in said slots, means for securing the shaft in its adjusted position, a brush rotatably mounted on said shaft, the periphery of said brush being concave for engagement with the periphery of a vehicle wheel, a rod secured to the under side of said guard and movable through the brace bar, a spring disposed between the brace bar and the mud guard upon said rod adapted to tensionally hold the brush in contact with a vehicle wheel, and means carried by the rod to regulate the tension of said spring.

2. An attachment of the character described, comprising curved parallel bars pivoted to the under side of a mud guard, a brace bar connecting said parallel bars, open-ended slots in the lower extremities of said parallel bars, a transverse shaft adjustably mounted in said slots, means for securing said shaft in its adjusted position, a wire brush rotatably mounted on said shaft, the periphery of said brush being concaved longitudinally for engagement with the periphery of a vehicle wheel, a rod secured to the under side of said guard a spiral spring disposed upon said rod, said spring being adapted to bear upon said connecting bar to maintain said brush in frictional engagement with a vehicle wheel.

3. An attachment of the character described, comprising curved parallel bars pivoted to the under side of a mud guard, a transverse connecting bar secured to said parallel bars, open-ended slots in the extremities of said parallel bars, a transverse shaft adjustably mounted in said slots, means to retain said shaft in its adjusted position, a brush rotatably mounted upon said shaft, a rod having a plate formed at its upper end secured to the under side of said mud guard, a spiral spring disposed upon said rod between said plate and said connecting bar and adapted to maintain said brush in frictional engagement with the wheel, and an adjustable sleeve upon the lower end of said rod to regulate the tension of said spring.

In testimony whereof I affix my signature, in presence of two witnesses.

JOSEPH A. SAUER.

Witnesses:
RUSSELL C. NESBITT,
HORACE C. SHANK.